United States Patent [19]

Timor

[11] 4,383,323
[45] May 10, 1983

[54] SPREAD SPECTRUM FH-MFSK TRANSMITTER AND RECEIVER

[75] Inventor: Uzi Timor, Middletown, N.J.

[73] Assignee: Bell Telephone Laboratories, Incorporated, Murray Hill, N.J.

[21] Appl. No.: 157,267

[22] Filed: Jun. 9, 1980

[51] Int. Cl.³ .......................... H04J 6/00; H04K 1/00
[52] U.S. Cl. ........................................ 375/1; 375/2.2; 455/32; 370/93
[58] Field of Search ............... 375/1, 2; 455/31, 32, 455/38; 364/485; 370/93, 92

[56] References Cited

U.S. PATENT DOCUMENTS 4,066,964 1/1978 Costanza et al. .................... 455/32
4,193,030 3/1980 Rabow et al. ........................ 375/2

OTHER PUBLICATIONS

IEEE 27th Vehicular Conf. Record, Mar. 16-18, 1977, "A Spread Spectrum Technique for High Capacity Mobile Communications," G. R. Cooper et al., pp. 98-103.
IEEE 28th Vehicular Conf. Record, Mar. 22-24, 1978, Grybos et al., pp. 98-104.
4th Int. Conf. on Digital Satellite Comm., Oct. 23-25, 1978, A. J. Viterbi, pp. 166-174.
1979 Ultrasonics Symposium Proceedings, Sep. 26-28, 1979, "A Satellite-Borne SAW Chirp Transform. System . . .," R. C. Williamson et al.
IEEE 1980 Int. Zurich Seminar on Digital Comm., Mar. 4-6, 1980, pp. A5.1-A5.6, D. J. Goodman et al.

Primary Examiner—Benedict V. Safourek
Attorney, Agent, or Firm—Erwin W. Pfeifle

[57] ABSTRACT

The present invention relates to transmitters (10) and receivers (30) for use in a spread spectrum radio communication system wherein transmitters generate FH-MFSK signals by adding elements of each user's Q level encoded message sample and that user's unique Q level, L-length frequency-hopping address sequence using the rules of algebra for finite fields. The receivers (a) spectrum analyze received transmissions during each chip or period of the L-length sequence to determine which Q level frequencies are received and (b) generate a set of decoded message signals by subtracting corresponding chip elements of a particular user's FH address sequence from those of the detected frequency levels using the rules of algebra for finite fields. The receivers then (c) determine which levels have a maximum length, and if only one then that level is determined as the correct message level and (d) if multiple maximum-length levels are determined then for each maximum-length level the set is permuted and the individual chips checked in a unique manner to determine the correct message level.

8 Claims, 10 Drawing Figures

FIG. 1
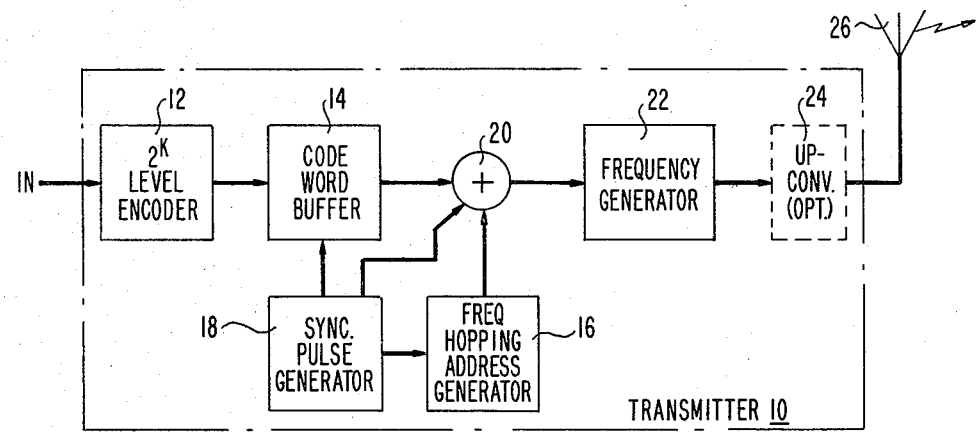
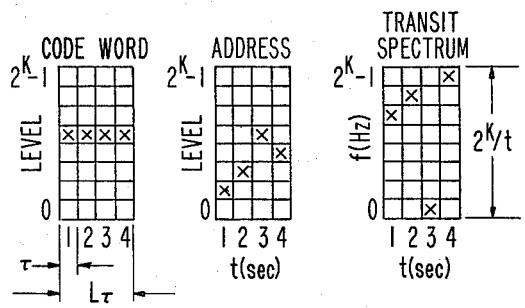
FIG. 2
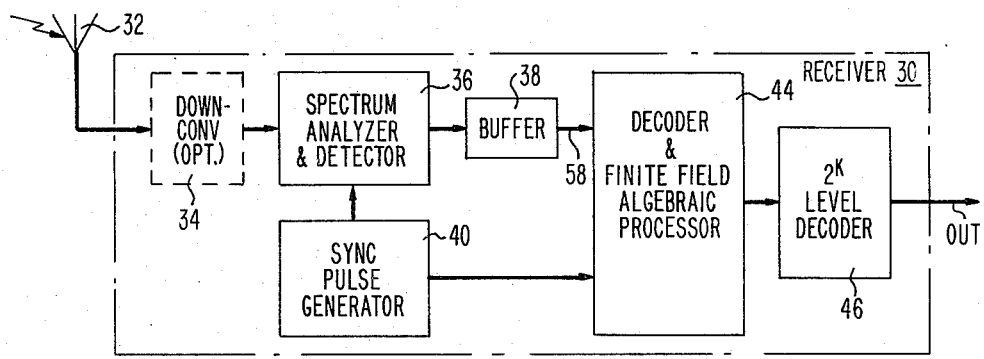
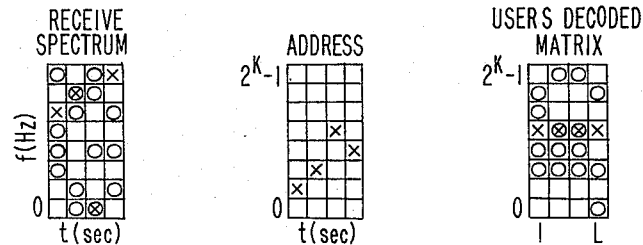

| i | $k_i$ |
|---|---|
| 3 | 2 |
| 2 | 4 |
| −1 | 1 |
| −2 | 6 |
| −3 | 5 |

SPREAD SPECTRUM FH-MFSK TRANSMITTER AND RECEIVER

BACKGROUND OF THE INVENTION

1. Field of the Invention

The present invention relates to a spread spectrum frequency-hopping multilevel frequency shift keying (FH-MFSK) transmitter and receiver and, more particularly, to a spread spectrum L-length frequency-hopping sequence, Q level frequency shift keying receiver, where Q is a prime or an integer power of a prime, which is capable of decoding an L-length received signal, which includes a desired signal and other interference signals, using both a particular user's FH address sequence and the rules of algebra of finite fields to generate a resultant $L \times Q$ receive matrix of signals which is then processed in accordance with the rules of algebra for finite fields to enable the choosing of the desired one of one or more of the Q levels having a maximum sequence value equal to or less than L for conversion to a user's indicated received signal.

2. Description of the Prior Art

Spread spectrum radio communication systems using various modulation techniques have evolved to provide protection of transmitted radio signals from detection, demodulation and/or interference by outside sources. In multiple access spread spectrum communication, each user has access to the whole system bandwidth. One way of distinguishing the signals from different users is to give each user an address consisting of a fixed pattern in time and frequency. The information to be transmitted is modulated or coded onto the address. The receiver detects the appropriate address and decodes the message. This technique is often referred to as random-access-discrete-address (RADA) or code-division multiple access (CDMA).

The two major impairments of mobile radio communication systems are interference from other users and multipath fading. The conventional Frequency Division Multiple Access (FDMA) technique uses guard bands between frequency channels to minimize interference and increased signal power to combat fading. Recently, various frequency-hopping (FH) techniques have been proposed for use in mobile and satellite radio systems.

One such technique is disclosed in the article "A Spread Spectrum Technique for High Capacity Mobile Communications" by G. R. Cooper et al in the Conference Record of the *Twenty-Seventh Annual IEEE Vehicular Technology Conference* at Orlando, Fla. on Mar. 16-18, 1977 at pages 98-103 which relates to a cellular spread spectrum frequency-hopped, differential phase shift keying (FH-DPSK) mobile communication system. In a typical receiver an array of delay lines and bandpass filters selects the desired address waveforms out of the incoming signal. The phases of the various elements of the desired signal are detected relative to the previous word and are then passed through a linear combiner and maximum-likelihood decision circuit for proper processing.

Another technique for use with a satellite communication system is disclosed in the article "A Processing Satellite Transponder for Multiple Access by Low-Rate Mobile Users" by A. J. Viterbi in the Conference Record of the *Fourth International Conference on Digital Satellite Communicaions* at Montreal, Canada on Oct. 23-25, 1978 at pages 166-174 which relates to a frequency-hopping, multilevel frequency shift-keyed (FH-MFSK) arrangement. In the disclosed receiving section, a set of received $2^K$ level, L-length signals are spectrally decoded and processed to select a produced L-length transmission as the decoded signal. If two or more L-length signals are produced, resolution would be to arbitrarily choose one as the correct message.

The use of FH-MFSK techniques with mobile radio communication systems, however, provides problems of, for example, multipath fading and noise which are not necessarily as prevalent in satellite communication systems. Typically, multipath propagation and noise would lead to imperfect tone detection of the various concurrent frequency-hopped signals at the receiver, causing additional errors. In many instances, multiple full L-length levels may be found in decoding a received signal of many concurrent users and also at many other instances the degrading of certain signals by multipath propagation and noise may result in no full L-length signal sequence being found at the receiver.

The problem remaining in the prior art is to provide a FH-MFSK receiver which can decode multiple concurrently received FH-MFSK signals and provide an output signal indicative of the current signal under conditions where the decoded received signal results in one or more sequences which share a maximum value, over each L-length period, equal to or less than L.

SUMMARY OF THE INVENTION

The foregoing problem has been solved in accordance with the present invention which relates to a spread spectrum frequency-hopping (FH), multilevel frequency shift keying (MFSK) transmitter and receiver and, more particularly, to a spread spectrum L-length FH sequence, Q level FSK receiver, where Q is a prime or an integer power of a prime, which is capable of decoding an L-length received signal, including a desired signal and other interference signals, using both a particular user's FH address sequence and the rules of algebra of finite fields to generate a resultant $L \times Q$ receive matrix of binary signals which are then processed in accordance with the rules of algebra for finite fields to enable the choosing of the desired one of one or more of the Q levels having a maximum detected sequence length equal to or less than L for conversion to a particular user's originally transmitted message.

In operation, the receiver spectrum-analyzes the received signal to determine which frequency components are present during each period of an L-length sequence and then demodulates a particular L-length frequency-hopped address signal with the derived frequency components using the rules of algebra for finite fields to arrive at a Q by L-length matrix of resultant decoded frequency components. A processor then determines which L-length levels of the matrix comprise a maximum number of derived frequency components and if only one such level is found then this level is determined as the particular user's correct message. Where multiple equal maximum-number levels are found, the processor then checks each of the equal maximum-number levels by reorienting the levels of the matrix by subtracting the level number of one of the maximum-number levels from all levels of the matrix in accordance wth the rules of algebra for GF(Q) where GF(Q) is a finite field (Galois field) of Q elements. The reoriented matrix is next permuted in accordance with a table of Q-1 pairs (q, q') formed by all non-zero elements qeGF(Q) which are expressed by their components q′, i.e., q=$\beta^{q'}$, where $\beta$ is a primitive element in GF(Q). For each chip n, n=1, ..., L, all columns j in the resultant matrix (j=1, ..., L), except j≠n and j≠n+1, are cyclically shifted $S_{n,j}$ positions in accordance with a cycle shifting matrix S. If for some n a complete row except for the $n^{th}$ term, of frequency components is not found, the maximum-number level used originally for the subtracting step is determined as the particular user's correct message.

It is an aspect of the present invention to provide a transmitter which modulates a user's Q level encoded signal with that user's unique Q level, L-length FH address sequence using the rules of algebra for finite fields to transmit a user's signal.

Other and further aspects of the present invention will become apparent during the course of the following description and by reference to the accompanying drawings.

BRIEF DESCRIPTION OF THE DRAWING

Referring now to the drawings, in which like numerals represent like parts in the several views:

FIG. 1 is a block diagram of a FH-MFSK transmitter in accordance with the present invention;

FIG. 2 is a block diagram of a FH-MFSK receiver capable of receiving multiple FH-MFSK signals and choosing a desired user's signal therefrom in accordance with the present invention;

DETAILED DESCRIPTION

Figure 3:
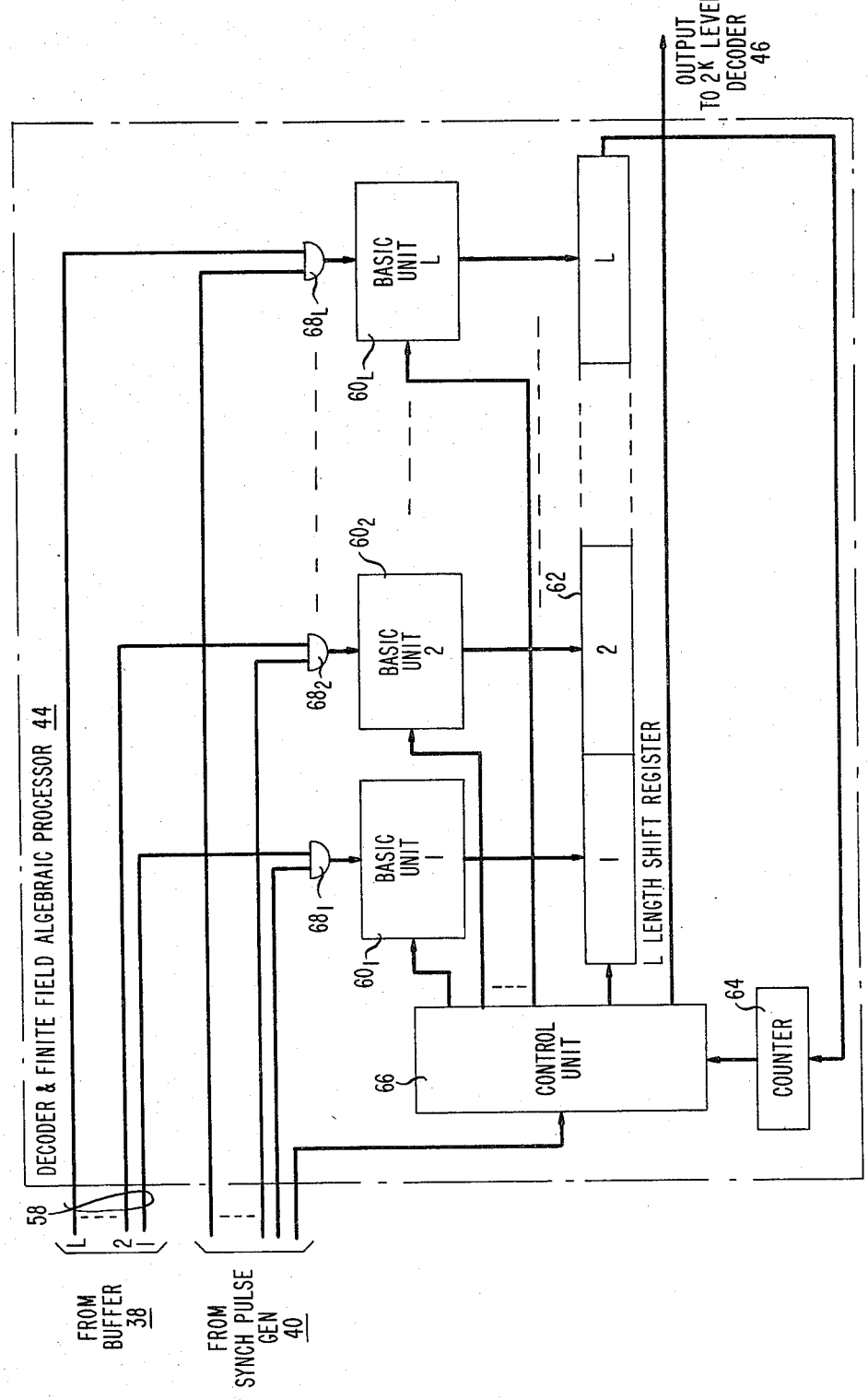
FIG. 3 is a block diagram of an exemplary decoder and finite field algebraic processor in accordance with the present invention for use in the receiver of FIG. 2.

The present invention is described hereinafter primarily with the use of $2^K$ frequencies as elements of GF($2^K$), the finite field (Galois field) of $2^K$ elements. However, it will be understood that such description is exemplary only and is for the purposes of exposition and not for purposes of limitation. It will be readily appreciated that the inventive concept described is equally applicable for finite fields existing for all Q=$p^n$, where p is a prime and n is an integer, and that the present arrangements can be extended for use in systems with Q frequencies.

A block diagram of a typical spread spectrum frequency-hopping, multilevel frequency shift keying (FH-MFSK) transmitter for use, for example, in a mobile radio communication system in accordance with the present invention is shown in FIG. 1. The transmitter 10 comprises a $2^K$ level encoder 12 which functions, for example, to periodically sample an analog input signal from a particular system user and convert the amplitude level of each sample into an equivalent level of a $2^K$ level code, where each level can be represented as a K-bit code word. If, on the other hand, the input signal from the particular system user is in binary form, encoder 12 is bypassed since each group of K sequential bits is already in a form of an equivalent level of the $2^K$ level code. In either case, the resultant equivalent level of the code can be, for example, stored temporarily in a code word buffer 14 as a K-bit word for a duration of T seconds comprising L subintervals, where each subinterval, hereinafter to be termed a "chip", has a duration of $\tau$ seconds. An exemplary level of a code word is shown in the matrix of FIG. 1 below code word buffer 14 and designated "Code Word" where the exemplary code word comprises 4-chips, where L=4, and each chip has an indication in level 4 of a possible 0–7 levels, where K=3, the corresponding content of the code word buffer 14 being a binary "100".

A frequency-hopping address generator 16 functions to generate a unique frequency-hopping address code word which is different for each system user within the same zone or cell. The addresses of all users have a common algebraic structure, where the particular address of each user is determined by that user's own unique parameter. The address code word is a sequence of L chips with each chip having a duration of $\tau$ seconds and comprising a K-bit code word which represents one level of a $2^K$ level code which can be a different level for each chip of the address word. For example, as shown in the matrix designated "Address" below generator 16 in FIG. 1, an address word for a particular system user may comprise four chips, where L=4, where chips 1-4 are designated code levels 1, 2, 4 and 3, respectively, within the $2^K$ possible code levels 0–7 for each chip where K=3.

A synchronizing pulse generator 18 functions to generate pulses from an internal clock for causing the corresponding chips of both the code word and address word to be concurrently transmitted to a finite field algebraic adder 20. Adder 20 functions to add the binary values designated for the indicated levels of the corresponding chips of the code and address word using the rules of algebra for finite fields to generate a new L-length code word as shown in, for example, the matrix designated "Transmit Spectrum" in FIG. 1. For example, during chip interval 1, adder 20 would add the binary "100" for the code word and the binary "001" for the address using the rules of algebra for finite fields which effectively does normal binary addition but discards any carry-overs. The result of such addition is a binary "101" and a "1" or "X" is placed in level 5 of chip 1 in a Transmit Spectrum matrix shown in FIG. 1. Each of the chip intervals results in a similar addition of the two indicated components to arrive at the associated transmit code word component. This resultant new code word is used by a frequency generator 22 to generate a particular one of $2^K$ frequencies, within the system's overall bandwidth, for each chip of $\tau$ second duration of the new code word as designated by the corresponding level of each chip of the Transmit Spectrum code word. For example, for the "Transmit Spectrum" matrix of FIG. 1, frequency generator 22 will transmit a frequency corresponding to the 5, 6, 0 and 7 level during the $\tau$ second duration of chips 1-4, respectively. This sequence of L tones or frequencies can be upconverted by optional upconverter 24 into the proper system transmit frequency spectrum, if not already done so by generator 22, for transmission by antenna 26.

It is to be understood that elements 12, 14, 16, 18, 20, 22 and 24 of transmitter 10 can comprise any suitable circuit which will perform the functions indicated hereinbefore. For example, buffer 14 and address generator 16 can comprise memory devices which temporarily store the code word or permanently store the address word, respectively, for accessing at the appropriate time.

In summary, at transmitter 10, K source bits are accumulated in a buffer 14 and held for $L\tau$ seconds while they are added using the rules of algebra for finite fields as a K-bit word to each of the K-bit elements of the address word from generator 16. The sums determine the sequence of transmitted frequencies. Each link or user pair in the system is identified by an address which is a sequence of L K-bit words. A new code word, conveying K bits, is transmitted every $L\tau$ seconds as a sequence of L tones. Each tone is determined by the sum of a K-bit word from the source and one of the K-bit address words.

FIG. 2 illustrates a receiver 30 in accordance with the present invention capable of receiving and decoding a FH-MFSK signal transmitted by a transmitter of FIG. 1. The FH-MFSK signal is received at an antenna 32 and downconverted, if necessary, by an optional downconverter 34 to a proper frequency band prior to further processing. The received or downconverted signal is processed by a spectrum analyzer and detector circuit 36 to determine which of the $2^K$ frequencies or tones are present during each chip interval. The received signal, however, is generally a composite of the time-synchronous tone sequences of a plurality of transmitters. Spectrum analyzer and detector circuit 36 can comprise $2^K$ tone detectors for determining which of the $2^K$ tones are present. Each tone detector then would decide, every $\tau$ seconds, whether the received signal contains energy at a separate distinct one of the $2^K$ frequencies to which it is tuned to detect. Alternatively, spectrum analyzer and detector 36 can comprise a spectral estimating transponder as shown in FIG. 2 of the hereinbefore-mentioned article by A. J. Viterbi. In any case it will be understood that spectrum analyzer and detector 36 can comprise any suitable arrangement for detecting the various frequencies present during each chip interval and for generating an appropriate output signal indicating which frequencies are present. The matrix of received energy in FIG. 2 shows the transmitted tones of FIG. 1, indicated by "Xs", and the tones, indicated by circles, received from various other links, which is shown as from 4 other links. The resultant Receive Spectrum matrix entries formed by the output signals from Spectrum Analyzer and Detector 36 are transmitted to a buffer 38. Buffer 38 comprises a memory including, for example, L storage locations where each storage location is capable of storing the $2^K$ bits associated with a separate chip of the L-length sequence of received signals as transmitted by Spectrum Analyzer and Detector 36 every $\tau$ seconds. At the end of each L-length sequence, the L storage locations are concurrently read out and the information ($2^K$ bits) from each storage location is serially transmitted over separate leads of a cable 58 to Decoder and Finite Field Algebraic Processor 44.

Decoder and Finite Field Algebraic Processor 44 functions to first decode the received signals over an L chip sequence by subtracting the binary value of the level number in each chip of the FH address code word of a particular user for which decoding is to be performed from the binary value of the level number of each detected signal in a corresponding chip forming the Resultant Receive Spectrum matrix using the rules of algebra for finite fields. For example, where it is desired to decode the received message from the particular user whose message was transmitted as shown in the matrices of FIG. 1, the same FH address code word as used at the remote transmitter of FIG. 1 would be used at the receiver of FIG. 2. In the decoding process, during chip 1, for example, processor 44 subtracts the binary value of level 1 (001), representative of the address code for chip 1, from each of the binary values of levels 2, 3, 4, 5 and 7 (010, 011, 100, 101 and 111), representative of the levels in chip 1 of the Receive Spectrum matrix for which receive frequencies were detected, using the rules of algebra for finite fields. The result of the five subtractions are binary values 011, 010, 101, 100 and 110, respectively, and a "1" would then be placed in the levels 3, 2, 5, 4 and 6 in chip 1 of the illustrative User's Decoded matrix shown in FIG. 2. Similar subtractions, using the rules of algebra for finite fields, would be performed for each of chips 2-4 to produce the User's Decoded Matrix of FIG. 2.

In the absence of transmission impairments, the transmitted code word always results in a complete row of entries in the User's Decoded matrix. Errors in choosing a correct message can occur when the tones from other links combine to form other complete rows in the User's Decoded matrix. It becomes evident that as the number of users increases, the greater becomes the possibility that multiple complete rows might exist. Additionally, thermal noise in the receiver can also influence the User's Decoded matrix since such noise can cause a tone to be detected when no such tones was originally transmitted, also known as a false alarm, or couse a transmitted tone to be omitted which is also known as a deletion. Therefore, as the amount of system users increases the possibility of multiple complete rows also increases. This compounded with the possibility of false alarms and deletions makes the choice of the correct one of the $2^K$ levels in the User's Decoded matrix difficult at times.

Having derived the User's Decoded matrix for the particular user's FH address code word, processor 44 next determines from the User's Decoded matrix if there are any complete rows, and if no complete rows are found then the row or rows having a maximum length. If only one such row is found, the level indication for that row is transmitted to a $2^K$ level decoder 46 which converts the indicated level to either a K-bit binary message or an analog signal sample having an amplitude corresponding to the indicated level, dependent on which one of the two type signals is required by the ultimate user.

As shown in FIG. 2, the User's Decoded matrix, hereinafter also designated $A_m$, includes two complete rows at levels 2 and 4, where row 2 was formed from signals from the other 4 users which combined to make a full row, and row 4 was formed from the desired user's signals plus some components of the other user's signals. In accordance with the present invention and as shown in FIGS. 5-8, processor 44 next proceeds to determine whether row 2 or 4 is the correct level for the exemplary user's message.

Figure 5:
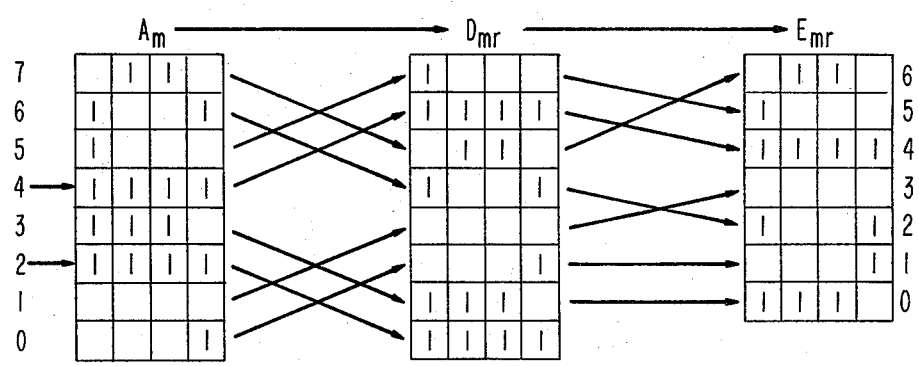
FIGS. 5 and 6 illustrate the procedure used by the decoder and finite field algebraic processor of FIG. 2 or 4 for checking row 2 of a User's Decoded matrix when such row is found full of entries to determine if row 2 is the user's message.
Figure 6:
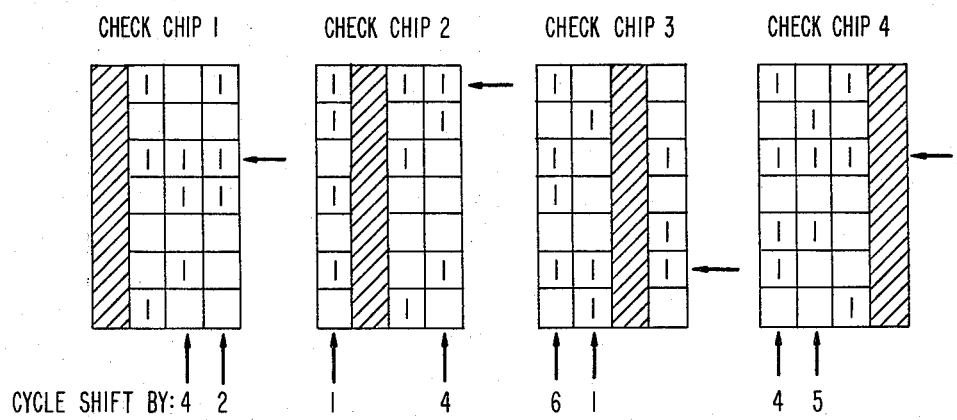

FIGS. 5 and 6 show a typical sequence which processor 44 uses to check if row 2 is the correct level. In FIG. 5, the User's Decoded matrix $A_m$ of FIG. 2 is shown at the left. Processor 44 proceeds to check row 2 by subtracting the interested row number, in this case 2 having a binary value 010, from each of the binary values for rows 0-7 in $A_m$ using the rules of algebra for finite fields to generate a rearranged matrix $D_{mr}$. More particularly, rows 0-7 of matrix $A_m$ are transposed into rows 2, 3, 0, 1, 6, 7, 4 and 5, respectively, to form matrix $D_{mr}$. For all subsequent processing in accordance with the present invention, row 0 of matrix $D_{mr}$ is discarded.

Processor 44 next performs a row permutation in accordance with Table 1 which is a table of $2^K - 1$ pairs $(q,q')$ generated by expressing all nonzero elements $q \epsilon GF(2^K)$ by their exponents $q'$, i.e., $q = \beta^{q'}$, where $\beta$ is a primitive element in the Galois field, $GF(2^K)$, where in the present case $\beta = 2$.

TABLE 1

| q | $\beta^q$ |
|---|---|
| 0 | 1 |
| 1 | 2 |
| 2 | 4 |
| 3 | 3 |
| 4 | 6 |
| 5 | 7 |
| 6 | 5 |

Therefore, permuted matrix $E_{mr}$ of FIG. 5 is formed by shifting the contents of levels 1-7 of matrix $D_{mr}$ to levels 0, 1, 3, 2, 6, 4 and 5, respectively, of matrix $E_{mr}$.

As shown in FIG. 6, processor 44 next checks each chip, n, where $n = 1, \ldots, L$ by cycle shifting all columns $j$ in $E_{mr}$ ($j = 1, \ldots, L$, and $j \neq n$ or $n+1$) $S_{n,j}$ positions according to a cycle shifting matrix S and then looks for a complete row, except for the term in the $n^{th}$ column. Cycle shifting matrix S is developed by computing $2(L-1)$ terms $k_i$, $i = \pm 1, \pm 2, \ldots, \pm(L-1)$ where $\beta^{ki}$ is a function of i which depends on the algebraic structure of the addresses and then generating the cycle shifting matrix $S = (S_{i,j})$ therefrom as $$S_{i,j} = \begin{cases} 0 & i = 1, \ldots, L \quad j = i \\ k_{j-i} & i = 1, \ldots, L-1 \; j = 1, \ldots, L \\ & \quad j \neq i \\ k_{j-L} - 1 & i = L \quad j = 1, \ldots, L-1 \end{cases} \quad (1)$$

In the example used in FIGS. 1, 2 and 5-8, $$\beta^{ki} = \frac{\beta - 1}{\beta^i - 1} \quad (2)$$

corresponding to an address structure $a'_{mn} = \gamma_m \beta^{j-1}$, where $a_{mj}$ is the address element of user M in chip j and $\gamma_m$ is uniquely assigned to user M and is different from all $\gamma_L$ assigned to other users $i \neq m$.

For example, as shown in FIG. 6, when processor 44 checks chip 1 of matrix $E_{mr}$ of FIG. 5, chip 1 is ignored and chip $n+1$, or chip 2, is not cycle shifted. All other chips are cycle shifted by an amount indicated by the value $k_i$ associated with the number i in the table of FIG. 6, where i represents the number of columns that a column to be cycle shifted is away from the column being checked. More particularly, in checking chip 1, chips 3 and 4 of matrix $E_{mr}$ are +2 and +3 columns removed, respectively, from chip 1 and, therefore, in accordance with the table of FIG. 6 are cycle shifted by respective amounts 4 and 2. After cycle shifting is complete, matrix $E_{mr}$ is as shown under the "Check Chip 1" matrix of FIG. 6 and in conclusion processor 44 checks for any complete rows, excluding entries of chip 1. As shown in FIG. 6 for checking chip 1, processor 44 will find that level 4 has entries in every column of columns 2-4 and such result is assumed to be a result of interferences. Processor 44 then continues to check each of chips 2-4 as shown in FIG. 6 a manner described hereinabove for checking chip 1.

In checking chip 2, processor 44 cycle shifts columns 1 and 4 by an amount 1 and 4, respectively, since they are a respective −1 and +2 columns removed from chip 2. In checking chip 2 processor 44 will find level 7 full of entries, excluding chip 2, and will conclude that interferences have caused the entry for chip 2. Chip 3 is similarly checked by cycle shifting columns 1 and 2 by an amount 6 and 1, respectively, since they are a respective −2 and −1 columns removed from chip 3. Again a full row of entries is found at level 1, excluding chip 3. In checking chip 4, the last chip, processor 44 cycle shifts columns 1 and 2 by an amount 4 and 5, respectively, instead of the amount 5 and 6 as shown in the table of FIG. 6 for columns removed by −3 and −2 columns from the chip being checked because, in accordance with cycle shifting matrix S, shown be equation (4), the last cycle shifting sequence has a "−1" associated with the shifting terms. After such cycle shifting has been completed, processor 44 will find a full row at level 4 when excluding chip 4. Since processor 44 finds that in checking each chip a full row has been found, excluding the chip being checked, in the procedure for checking row 2 of matrix $A_m$ of FIG. 5, processor 44 determines that all of the entries of row 2 were formed from interference signals and next continues to check row 4 of matrix $A_m$, the other maximum full length row of matrix $A_m$.

Figure 7:
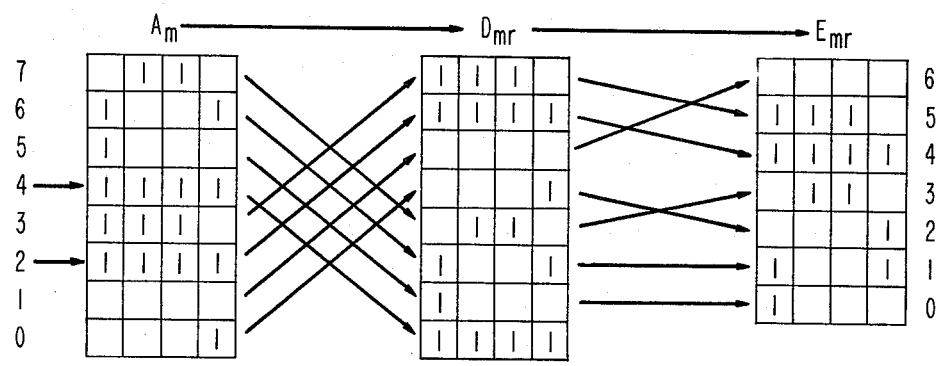
FIGS. 7 and 8 illustrate the procedure used by the decoder the finite field algebraic processor of FIG. 2 or 4 for checking row 4 of a User's Decoded matrix when such row is found full of entries to determine if row 4 is the user's message.
Figure 8:
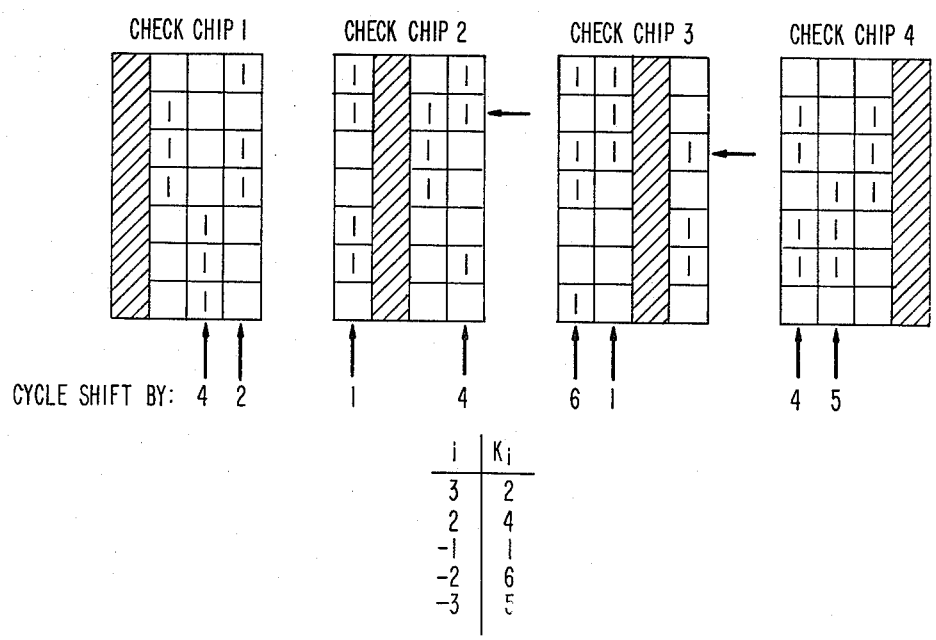

The procedure for checking row 4 of matrix $A_m$ is shown in FIGS. 7 and 8 and is identical to the procedure described hereinabove for checking row 2 except that in rearranging matrix $A_m$ to produce matrix $D_{mr}$, a binary value "100", representative of row "4" to be checked, is used for substracting from the binary values for the rows 0-7 to derive the rearrangement procedure. As can be seen in FIG. 8, in checking chips 1 and 4, no full row of entries is found, when excluding chips 1 and 4, respectively, and processor 44 determines that since interference could not have caused the entries in chips 1 and 4 of row 4 of matrix $A_m$, then row 4 is the correct message level for the exemplary user and this level number is transmitted to $2^K$ level decoder 46 of FIG. 2 to generate the proper output signal from receiver 30. It is to be understood that the process shown in FIGS. 5-8 can be terminated once no full row of entries is found when checking a particular chip.

In correlating the procedure of FIGS. 5-8 and the User's Decoded matrix of FIG. 2, it can be seen that processor 44 has correctly determined that interference signals are present in chips 1-4 of row 2 and chips 2 and 3 of row 4 and that the signals of chips 1 and 4 of row 4 could only have been caused by the particular user and that, therefore, row 4 is his correct message.

A block diagram of a typical decoder and finite field algebraic processor 44 for performing the procedure of decoding the signals received with a particular user's address code word and then the procedure shown in FIGS. 5-8 is shown in FIG. 3. Processor 44 comprises L identical basic units $60_1$-$60_L$ representing the L columns of the various matrices shown in FIGS. 2 and 5-8, an L-length shift register 62, a counter 64, a control unit 66 and a plurality of $2^K$ gates $68_1$-$68_L$ associated with each basic unit $60_1$-$60_L$, respectively, which gates are under the control of synchronous pulse generator 40 for gating the $2^K$ signals from spectrum analyzer and detector 36 over leads 58 into the appropriate basic unit $60_1$-$60_L$ during each chip interval of an L-length sequence.

In operation, during chip intervals 1-L; the $2^K$ signals during each chip interval are received from spectrum analyzer and detector 36 via buffer 38 on cable 58 and are gated by gates $68_1$-$68_L$ into the proper basic units $60_1$-$60_L$, respectively, under the control of enable signals from synchronous pulse generator 40. In this manner, signals of chips 1-L, representative of the Receive Spectrum matrix shown in FIG. 2, are stored in basic units $60_1$-$60_L$, respectively. Processor 44 next decodes the Receive Spectrum matrix using a particular user's address code word stored in control unit 66. In the decoding procedure, control unit 66 transmits the level of each chip 1-L for a particular user's address code word to the associated basic units $60_1$-$60_L$, respectively. Each basic unit 60 uses the associated address code word signal to appropriately shift its column entries in accordance with the rules of algebra for finite fields to arrive at the Decoded User's matrix, $A_m$, shown in FIGS. 2, 5 and 7.

Control unit 66 next causes basic units $60_1$-$60_L$ to concurrently cyclically shift the corresponding column entries of matrix $A_m$ into L-length shift register 62 so that each row can be counted by counter 64 to determine the number of entries therein. The result of each row count in counter 64 is transmitted to control unit 66 which then determines which rows are full, or of a maximum length if none are full. If only one row is determined by control unit 66 to be full of entries or have a maximum length, then that level indication is transmitted to $2^K$ level decoder 46. If on the other hand more than one row is determined as full or of a maximum length, then processor 44 causes basic units $60_1$-$60_L$ to manipulate matrix $A_m$ as shown in FIGS. 5-8 to determine which of the maximum length rows is the correct message row. Once the correct message row is determined, the level of the correct message row is transmitted to $2^K$ level decoder 46.

Figure 4:
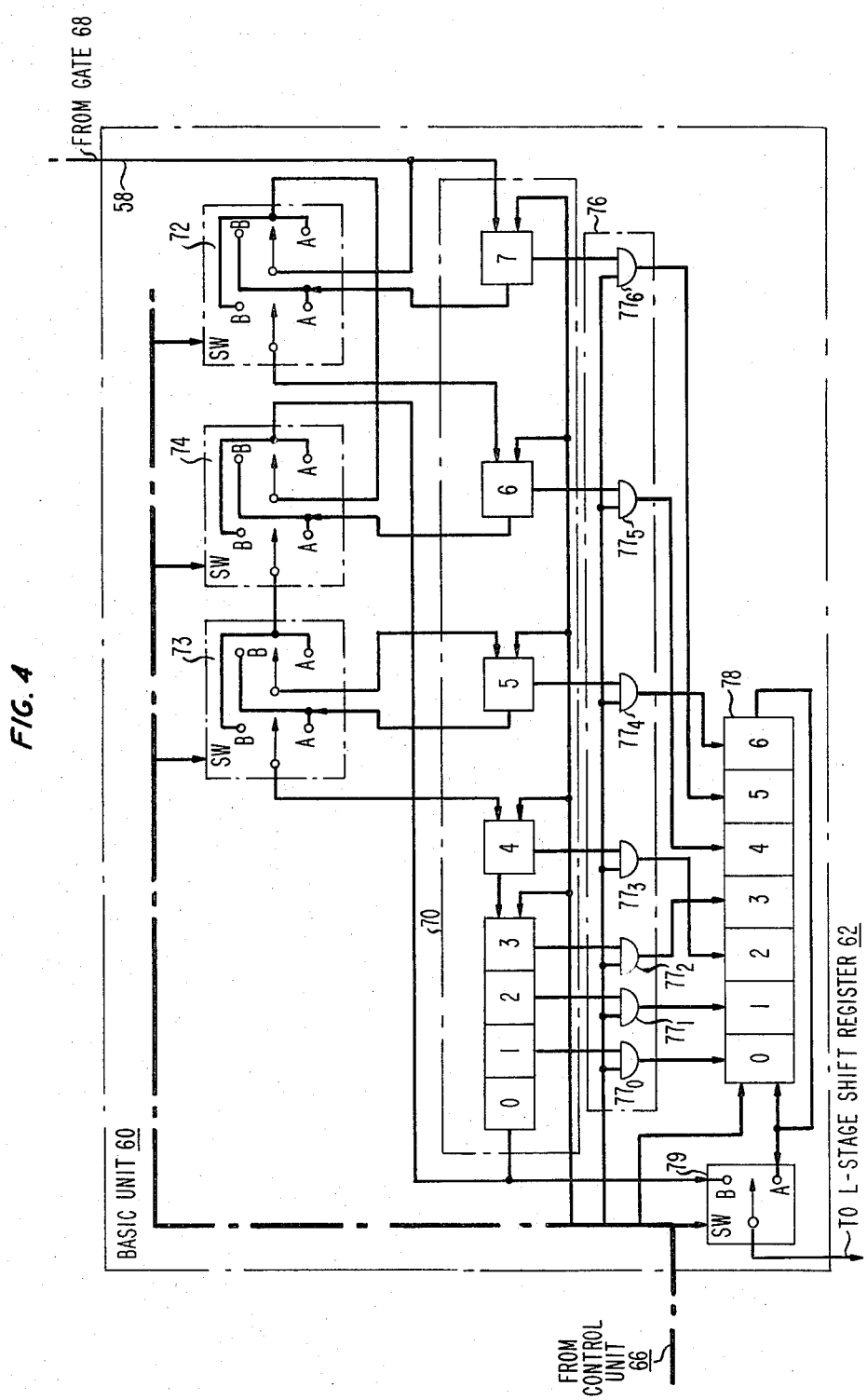
FIG. 4 is a block diagram of an exemplary basic unit in accordance with the present invention for use in the Decoder and Finite Field Algebraic Processor of FIG. 3 for the condition where K=3 and $2^K$ frequencies can be used to form the FH-MFSK signal.

FIG. 4 illustrates a block diagram of a typical basic unit 60 under conditions where K=3 such that matrix $A_m$ has levels 0-7 and matrix $E_{mr}$ has levels 0-6 for decoding and processing the FH-MFSK signals received in, for example, the Receive Spectrum matrix shown in FIG. 2. Basic Unit 60, for the K=3 case, comprises a shift register 70 which includes eight stages 0-7; three double-pole, double-throw switches 72, 73, and 74 coupled to stages 0 and 4-7 of register 70 as shown; a gating arrangement 76 comprising $2^K-1$ gates $77_0$-$77_6$ with each gate being coupled at one input thereof to a separate one of stages 1-7 of register 70; a $2^K-1$ stage shift register 78 comprising stages 0-6 each of which being coupled to the output of a separate one of gates $77_0$-$77_6$ in a predetermined format; and a single-pole, double-throw switch 79 for selectively switching either one of registers 70 and 78 to the associated stage of L-stage shift register 62. All switch operations are under the control of control unit 66.

To achieve the decoding of the signals received during the associated chip relating to a particular basic unit 60, the 8 bits of information forming the associated column of the Receive Spectrum matrix of FIG. 2 are gated from the appropriate storage location in buffer 38 via lead 58 and associated gate 68 into stages 0-7 of shift register 70 by cycle shifting with switches 72-74 in the "A" positions. Control unit 66 then causes the contents of register 70 to be cyclically shifted while operating switches 72-74 as outlined in Tables 2 and 3.

TABLE 2

| Address Code Word | Operate Switches for Cycles 1-8 in Accordance with Table 3 | | | Operate Switches 72-74 For Cycles 9-12 in Accordance with Table 3 |
|---|---|---|---|---|
| | Switch 72 | Switch 73 | Switch 74 | |
| 000 | — | — | — | — |
| 001 | 1 | 0 | 0 | — |
| 010 | 0 | 0 | 1 | — |
| 011 | 1 | 1 | 1 | — |
| 100 | — | — | — | 1 |
| 101 | 1 | 0 | 0 | 1 |
| 110 | 0 | 0 | 1 | 1 |
| 111 | 1 | 1 | 1 | 1 |

In Table 2 a "1" indicates that the related switch is operated as indicated in Table 3, a "0" indicates that the switch remains thrown to terminals A for the cycles indicated and a "—" indicates that the cycles indicated need not be performed at all for the associated address code word. From Table 2 it can be seen that (a) switch 72 is only operated according to Table 3 when the least significant bit of the address code word is a "1", (b) switch 74 is only operated when the second least significant bit in the address code word is a "1", (c) switch 73 is only operated when the two least significant bits are both "1"s and (d) cycles 9-12 are only performed when the most significant bit of the address code word is a "1".

TABLE 3

| Switch/Cycle | 1 | 2 | 3 | 4 | 5 | 6 | 7 | 8 | 9 | 10 | 11 | 12 |
|---|---|---|---|---|---|---|---|---|---|---|---|---|
| 72(1) | A | B | A | B | A | B | A | B | A | A | A | A |
| 72(2) | A | B | A | A | A | B | A | A | A | A | A | A |
| 73 | A | A | A | B | A | A | A | B | A | A | A | A |
| 74 | A | A | B | B | A | A | B | B | A | A | A | A | where 72(1) is used when switch 74 is not scheduled for operation and 72(2) is used when switch 74 is scheduled to be operated during cycles 1-8 or 12. In Table 3 an "A" designation indicates that the associated switch should be thrown to the "A" position indicated in FIG. 4 and a "B" designation indicates that the associated switch should be thrown to the "B" position indicated in FIG. 4 when Table 2 indicates that the sequence of Table 3 should be instituted.

As an example, when decoding the Receive Spectrum shown in FIG. 2 with the Address Code Word also shown in FIG. 2, Basic Unit $60_1$ is associated with chip 1 and uses the address "001". With such address switch 72 is the only switch to be operated during cycles 1-8 in accordance with Table 2 and will be operated in the sequence shown in Table 3 for cycles 1-8. Basic Unit $60_2$ is associated with chip 2 and uses the address "010" and in accordance with Table 2 only switch 74 in basic unit $60_2$ would be operated in the sequence shown in Table 3 for cycles 1-8. Basic Unit $60_3$ is associated with chip 3 and uses the address "100" which according to Table 2 only requires 4 cycle shifts to be performed (cycles 9-12) with switches 72-74 in the "A" position. The last Basic Unit $60_4$ is associated with chip 4 and uses the address "011" which requires switches 72-74 to be set as shown in Table 3 for cycles 1-8. The end result will be the User's Decoded matrix, $A_m$, as shown in FIGS. 2, 5 and 7.

To check for full rows in $A_m$, control unit 66 places switches 72-74 in the "A" positions and switch 79 in the "B" positions and causes 8 cyclical shifts to concurrently occur in registers 70 of all Basic Units 60 so that entries in corresponding levels 0-7 are each concurrently gated to L-stage shift register 62 and then to counter 64 as explained hereinbefore. If as shown in FIGS. 5 and 7 control unit 66 determines that levels 2 and 4 are full entries, control unit causes the Basic Units 60 to first, for example, subtract 2 using the rules of algebra for finite fields to derive matrix $D_{mr}$ as shown in FIG. 5. To achieve such subtraction, control unit 66 causes each of the Basic Units 60 to cycle the decoded results 8 steps using the procedure shown in Tables 2 and 3. For example, to subtract a 2, the binary equivalent being 010, from Table 2 only switch 74 need be operated for cycles 1-8 in the manner shown in Table 3. Once all Basic Units 60 have concluded this procedure to derive matrix $D_{mr}$, a row permutation is now required to derive matrix $E_{mr}$ of FIG. 5.

To achieve a row permutation, control unit 66 pulses gates $77_0$-$77_6$ concurrently and the contents of stages 1-7 of registers 70 are entered in the appropriate stages 0-6 of register 78 via the direct wiring therebetween. To check each chip as shown in FIG. 6, control unit 66 causes the register 78 in the affected Basic Units 60 to be cycle shifted by the amount indicated in FIG. 6 and described hereinbefore. For example, to check chip 1, the registers 78 in Basic Units $60_3$ and $60_4$ would be cycle shifted by amounts 4 and 2 cycles, respectively. Once such cycle shifting was completed, control unit 66 would place switches 79 in Basic Units $60_2$-$60_4$ in the "A" position and concurrently cycle shift registers 78 seven times so that corresponding levels would each be sequentially gated to L-stage shift register 62 for counting by counter 64.

Each subsequent chip would be checked by again performing a row permutation in each Basic Unit 60, cycle shifting the appropriate registers 78 and then gating the corresponding levels of the pertinent registers 79 to L-stage shift register 62 for counting by counter 64. This whole procedure described hereinabove for checking row 2 would then be repeated for row 4 as shown in FIGS. 7 and 8 if control unit 66 determined that row 2 was only generated by interfering signals.

Figure 9:
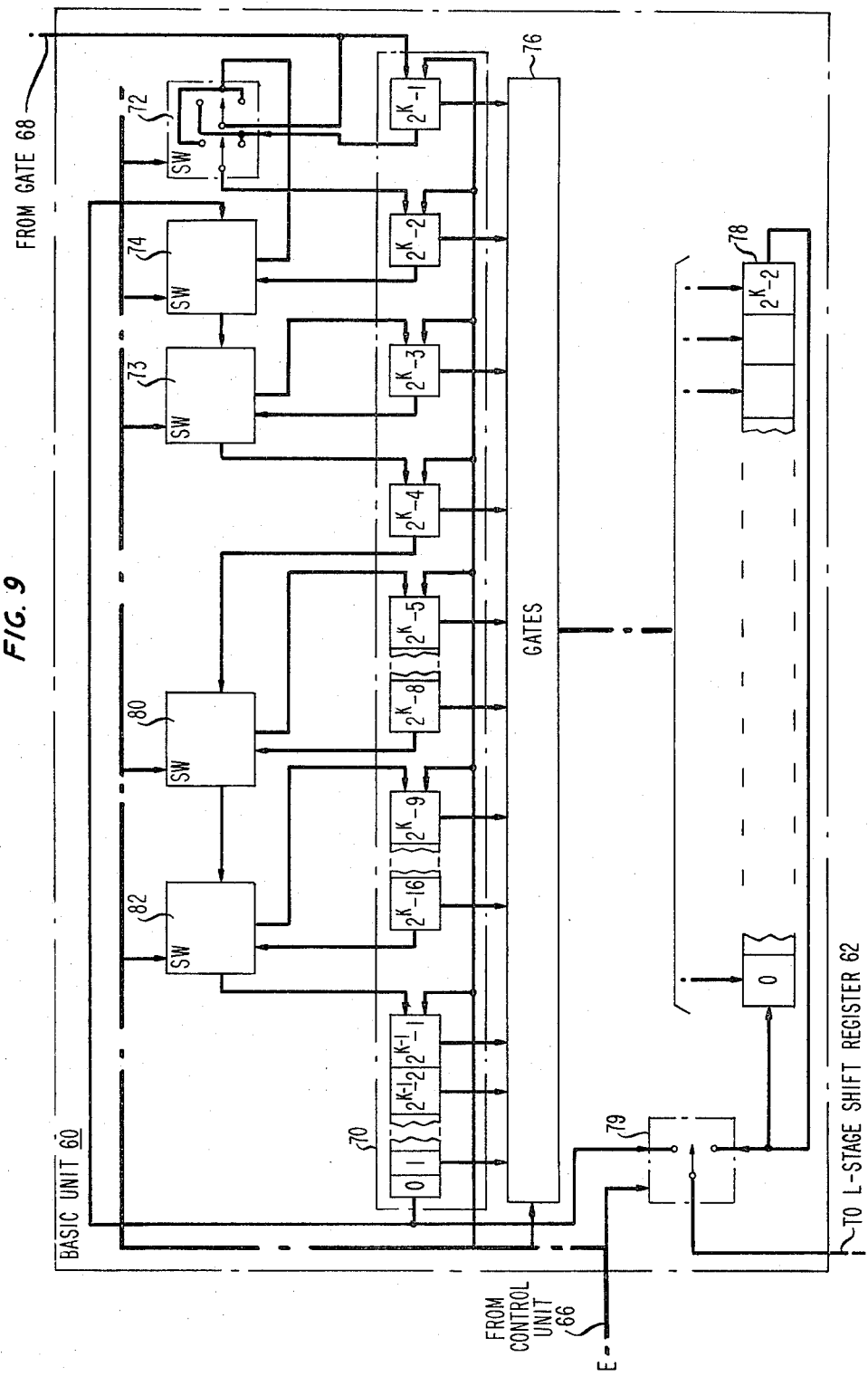
FIG. 9 is a block diagram of an exemplary basic unit in accordance with the present invention for use in the Decoder and Finite Field Algebraic Processor of FIG. 3 for any condition of K where $2^K$ frequencies are used to form the FH-MFSK signal by the transmitter of FIG. 1.

FIG. 9 illustrates the configuration of a Basic Unit 60 where $K>3$. To provide such Basic Unit, the arrangement of FIG. 4 switches 72-74 and the associated stages $2^K-1$ to $2^K-4$ is retained. The section containing stages $2^K-5$ to $2^K-8$ are associated with a switch 80 which is connected to a switch 82 which is associated with a section of register 70 including stages $2^K-9$ to $2^K-17$. Switch 82 has its output connected directly to the input of stage ($2^{K-1}-1$) of the last section of register 70. It is to be understood that (1) if more sections of register 70 are to be included between stages $2^K-17$ and $2^{K-1}-1$ that each intermediate section of stages would be coupled to a separate switch similar to that shown for switches 80 and 82 and that the last switch would be coupled at its output directly to the input of the last section of stages of register 70, and (2) that sections of register 70 starting at stage $2^K-1$ are added in 1, 1, 1, 1, 4, 8, 16, 32, 64, ..., etc., number of stages.

To achieve proper operation it is to be understood that as K increases additional bits are required in the address code word for each chip and therefore Tables 2 and 3 would have to be modified to accommodate the additional bits. For Table 2, the two least significant bits would still cause switches 72-74 to be operated as indicated for $2^K$ cycles and similarly the most significant bit of any address code would still cause the $2^{K-1}$ cycle shifts at the end of the $2^K$ cycles to be performed if the most significant bit is a "1". Table 3 would have to be expanded such that $2^K$ cycles would be shown instead of cycles 1-8. For switches 72-74 the sequence of Table 3 would be continued for the $2^K$ cycles. For switch 80, for example, being associated with 4 stages of register 70 would start in the "B" position for 4 cycles then in the "A" position for 4 cycles, then back to the "B" position for 4 cycles, etc. Switch 82, for example, being associated with 8 stages of register 70 would start in the "B" position for 8 cycles, then in the "A" position for 8 cycles, then back to the "B" position for 8 cycles, etc.

Figure 10:
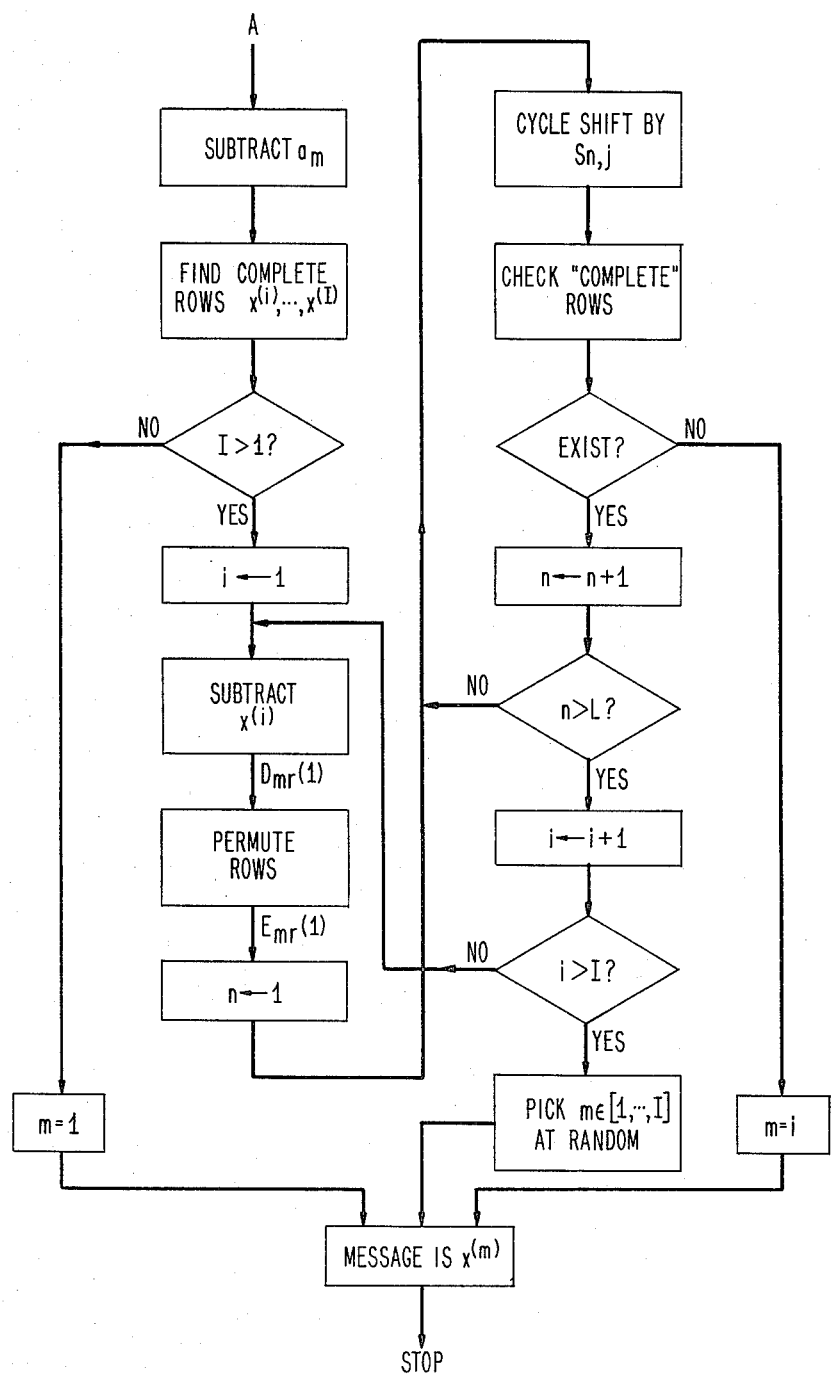
FIG. 10 is a flow diagram of a sequence of steps for implementing the Decoder and Finite Algebraic Processor of FIG. 2 by a microprocessor arrangement.

It is to be understood that the above-described embodiments are simply illustrative of the principles of the invention. Various other modifications and changes may be made by those skilled in the art which will embody the principles of the invention and fall within the spirit and scope thereof. For example, Decoder and Finite Field Algebraic Processor 44 could be implemented by a microprocessor which operates in accordance with the flow diagram of FIG. 10, which follows the steps shown in FIGS. 5-8.

The control unit 66 controls the operation of the decoder and finite field algebraic processor 44 to determine the correct level of the transmitted code word. The decision making process is performed by control unit 66. In the example shown in FIGS. 1, 2 and 5-8, it was understood that the process can be terminated, and the decision made, once no full row of entries is found when checking a particular chip.

In a noisy environment, however, transmitted entries might be deleted and additional entries might be inserted into the received matrix requiring different strategies in the decision making process. In this case, the control unit 66 checks all complete rows in the decoded matrix $A_m$, and if only one of them is found to have no full row of entries when checking a particular chip, that row is decoded as the correct code word. If more than one row of the matrix is found to have no full row of entries when checking a particular chip therein, control unit 66 can follow one of the following procedures: (a) choose the row of the matrix with the maximum number of chips for which no full row of entries exists when checked, or (b) repeat the check allowing for missing entries when checking each for full rows of entries. When control unit 66 fails to find any complete row of entries in the received matrix control unit 66 can then determine which rows have a maximum length and proceed in a manner similar to that just described above for the noisy environment condition.

In all cases, when no decision can be made as to the correct row, control unit 66 chooses one of such complete or maximum-length rows at random and transfers that level to $2^K$ level decoder 46.

I claim:

1. A decoding arrangement for use in a spread spectrum radio receiver (30) which receiver is capable of receiving one or more frequency-hopping, multilevel frequency shift keyed (FH-MFSK) signals which were remotely transmitted by modulating a separate one of a plurality of different L-length frequency-hopping address sequences with each user's separate signal sample where each signal sample is encoded as one of Q possible frequencies, where Q is a prime or an integer power of a prime and the address sequences of all users have a common algebraic structure and the particular address of each user is determined by that user's unique parameter; the decoding arrangement comprising:

spectrum analyzing means (36) capable of generating, in response to a received signal, an output signal indicating each of the possible Q frequencies in the received FH-MFSK signal during each period of the L-length sequence
characterized in that
the received FH-MFSK signals were originally formed by adding corresponding elements of each user's signal sample and each user's associated frequency-hopping address sequence in accordance with the rules of algebra for finite fields during each period of the L-length sequence; the decoding arrangement further comprising:
a processor (44) comprising means ($60_1$–$60_L$, 62, 64, 66) capable of decoding the received signals by subtracting a desired user's frequency-hopping address sequence from the time-period output signals from the spectrum analyzing means during each L-length sequence in accordance with the rules of algebra for finite fields to generate a Q level by L-length set of decoded signals.

2. A decoding arrangement according to claim 1 characterized in that
the processor means is further capable of determining which of the Q levels of the generated set of decoded signals have a maximum number of frequency indications over the L-length decoded sequence and (a) in response to an indication that only one level has a maximum value, generating an output signal indicative of that level as the particular user's correct message, and (b) in response to an indication that multiple levels have an equal maximum value, checking each maximum-valued level by (1) generating a reoriented set of decoded signals by shifting each level of the original set of decoded signals to the level number indicated by the subtraction of one of the maximum-valued level numbers from each level of said original set in accordance with the rules of algebra for GF(Q) where GF(Q) is a finite field of Q elements, (2) permuting the reoriented set of decoded signals in accordance with a table of Q−1 pairs (q, q') formed by all non-zero elements q∈GF(Q) expressed by their components q' in q=$\beta^{q'}$ where $\beta$ is the primitive element in GF(Q), (3) for each period n of the sequence, n=1,..., L, cyclically shifting all columns l in the permuted set of signals where l=1,..., L; l≠n, n+1, in accordance with a cycle shifting matrix, $S_{ij}$ generated by computing 2(L−1) terms $k_i$, where i=±1,±2,..., ±(L−1) and $\beta^{ki}$ is a function of i which depends on the algebraic structure of the address sequences, and (4) generating an output signal indicative of the maximum-valued level where for some n a complete row 1, except for the $n^{th}$ term, is not found.

3. A decoding arrangement according to claim 1 or 2 characterized in that
Q=$2^K$, and
the processor means comprises:
a $2^K$ stage shift register (70) capable of storing a $2^K$ bit binary output signal from the spectrum analyzing means; and
a plurality of $2^K$ switching means (72–74, 80, 82) coupled to each other and the various stages of said shift register in a predetermined manner, each of the switching means being capable of being operated in a predetermined manner during each step of at least a $2^K$ cycle sequence to cause binary digits stored in the stages of said shift register to be shifted to positions within said shift register corresponding to positions said binary digits would occupy after either one of a binary addition and subtraction process had been performed between the originally stored binary number and a second binary number using the rules of algebra for finite fields.

4. A decoding arrangement according to claim 3 characterized in that
the $2^K$ stage shift register (70) is sectionalized into 1, 1, 1, 1, $2^2$, $2^3$,..., $2^{K-1}$ stage sections starting at the $2^K$ stage; and
each of the plurality of $2^K$ switching means (72–74, 80, 82) is a double-pole, double-throw switching means comprising an input, an output and a first and a second terminal, each switching means being arranged to connect the input and output terminals to the first and second terminals, respectively, when the switch is thrown in a first position in response to a first enable signal, and to connect the input terminal directly to the output terminal when the switch is thrown in a second position in response to a second enable signal, a first and a second one of said $2^K$ switches (72, 73) having the first and second terminals thereof coupled to the input and output terminals of the $2^K$ and $2^K-2$ stages, respectively, of said shift register and the output terminal thereof coupled to the input of the next stage of the shift register, a third one (74) of said $2^K$ switches having its input terminal and output terminal coupled to the output of stage "one" of said shift register and the input of said second one of the $2^K$ switches, respectively, and the first and second terminals coupled to the input of said first one of the $2^K$ switches and the output of the $2^K-1$ stage of the shift register, respectively, and each subsequent one of the $2^K$ switches being connected serially between the output of the $2^K-3$ stage and the input of the last section of the shift register with each subsequent switch having its first and second terminals coupled to the input and output, respectively, of a separate sequential remaining section of said shift register.

5. A decoding arrangement according to claim 1 or 2 characterized in that
the processor means comprises a microprocessor including a memory capable of storing the output signals from the spectrum analyzing means and a control section capable of generating a desired user's frequency-hopping address sequence and for decoding therewith the stored output signals to determine the desired user's correct message in the received signal.

6. A transmitter for use in a spread spectrum radio system for generating a frequency-hopping, multilevel frequency shift keyed (FH-MFSK) signal, the transmitter comprising:
  a Q level encoder (12), where Q is a prime or an integer power of a prime, capable of converting either one of a periodic sample of an analog message signal and a group of K sequential message bits of a binary signal into an equivalent level of a Q level code and generating an output signal indicative of such equivalent level; and
  a frequency-hopping address generating means (16) capable of generating as an output signal an L-length frequency-hopping address sequence which is associated with a particular user whose message signals were converted by the Q level encoder, where the address sequences of all users have a common algebraic structure and the particular address of each user is determined by that user's unique parameter
characterized in that
the transmitter further comprises:
  adding means (20) capable of adding corresponding elements of the output signals of the Q level encoder and the frequency-hopping address generating means in accordance with the rules of algebra for finite fields during each period of the L-length sequence and generating an output signal indicative of such addition; and
  a frequency generator (22) capable of generating a FH-MFSK output signal representative of the output signal from said adding means.

7. A method of decoding one or more concurrently received frequency-hopping, multilevel frequency shift keyed (FH-MFSK) signals which were originally generated by modulating a separate one of a plurality of different L-length frequency-hopping address sequences with each user's separate signal sample where each signal sample is encoded as one of Q possible frequencies where Q is a prime or an integer power of a prime and the address sequences of all users have a common algebraic structure and the particular address of each user is determined by that user's unique parameter, the method comprising the steps of:
  (a) spectrum analyzing the received signals for determining which of the possible Q frequencies are preent in the received FH-MFSK signals during each period of the L-length sequence
characterized in that
the received FH-MFSK signals were originally formed by adding corresponding elements of each user's signal sample and each user's associated frequency-hopping address sequence in accordance with the rules of algebra for finite fields during each period of the L-length sequence, the method comprising the further step of:
  (b) decoding the received signals by adding the binary value of the Q frequencies determined as present in step (a) with a desired user's frequency-hopping address sequence during each period of the L-length sequence in accordance with the rules of algebra for finite fields to generate a Q level by L-length set of decoded signals.

8. The method of decoding according to claim 7 characterized in that
the method comprises the further steps of:
  (c) determining which of the Q levels of the generated set of decoded signals have a maximum number of frequency indications over the L-length decoded sequence;
  (d) in response to a determination in step (c) that only one level has a maximum value, generating an output signal indicative of that level as the desired user's correct message;
  (e) in response to a determination in step (c) that multiple levels have an equal maximum value, generating a reoriented set of decoded signals by shifting each level of the original set of decoded signals to a level number indicated by the subtraction of one of the maximum-valued level numbers from each level of said original set in accordance with the rules of algebra for GF(Q) where GF(Q) is a finite field of Q elements
  (f) permuting the reoriented set of decoded signals generated in step (e) in accordance with a table of $Q-1$ pairs (q, q') formed by all non-zero elements $q \epsilon GF(Q)$ expressed by their components q' in $q = \beta^{q'}$ where $\beta$ is a primitive element in GF(Q);
  (g) for each period n of the sequence, $n = 1, \ldots, L$, cyclically shifting all columns l in the permuted set of signals from step (f) where $l = 1, \ldots, L$; $l \neq n$ or $n+1$, in accordance with a cycle shifting matrix, $S_{ij}$, generated by computing $2(L-1)$ terms $k_i$, where $i = \pm 1, \pm 1, \ldots, \pm (L-1)$ and $\beta^{K_i}$ is a function of i which dependes on the algebraic structure of the address sequences; and
  (h) generating an output signal indicative of the maximum-valued level used in step (e) where for some n a complete row l, except for the $n^{th}$ term, is not found;
  (i) when only complete rows l are found in step (h), reiterating steps (e) to (h) for each of the other multiple equal maximum-valued levels found in step (e) until for some n in step (h) a complete row l, except for the $n^{th}$ term, is not found; and
  (j) when only complete rows are found when performing steps (e) to (i) for all maximum-length levels determined in step (c), randomly choosing one of said maximum-length levels and generating an output signal indicative of said chosen maximum-length level.

* * * * *